United States Patent
Kitani (10) Patent No.: US 8,132,228 B2
(45) Date of Patent: Mar. 6, 2012

(54) ELECTRONIC DOCUMENT CONVERSION DEVICE AND ELECTRONIC DOCUMENT CONVERSION METHOD

(75) Inventor: Hideyuki Kitani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 12/431,307

(22) Filed: Apr. 28, 2009

(65) Prior Publication Data

US 2009/0282459 A1  Nov. 12, 2009

(30) Foreign Application Priority Data

May 8, 2008 (JP) ................................ 2008-122562

(51) Int. Cl.
*H04L 9/00* (2006.01)
*H04L 9/32* (2006.01)

(52) U.S. Cl. ..................................... 726/1; 726/2; 726/3
(58) Field of Classification Search .................. 726/1–3, 726/10, 26–27, 30–31; 713/176; 380/51
See application file for complete search history.

(56) References Cited

U.S. PATENT DOCUMENTS 7,715,564 B2 * 5/2010 Nakahara et al. ............. 380/277
7,797,743 B2 * 9/2010 Treacy et al. ................... 726/22

FOREIGN PATENT DOCUMENTS

JP 2001-216230 8/2001

* cited by examiner

*Primary Examiner* — Hosuk Song
(74) *Attorney, Agent, or Firm* — Fitzpatrick, Cella, Harper & Scinto (57) ABSTRACT

Based on the security policy set in the original document and the security policy supported by the format of conversion destination, it is judged whether or not the security policy set in the original document is inheritable to the electronic document after format conversion. If it is judged that the security policy is inheritable, the security policy set in the original document is inherited to the electronic document after format conversion. If it is judged that the security policy is not inheritable, a process for inheriting the security policy set in the original document to the electronic document after format conversion is not performed.

13 Claims, 9 Drawing Sheets

ELECTRONIC DOCUMENT CONVERSION DEVICE AND ELECTRONIC DOCUMENT CONVERSION METHOD

BACKGROUND OF THE INVENTION

1. Field of the Invention

The present invention relates to an electronic document conversion device and an electronic document conversion method for converting an electronic document to an electronic document in a different format. More particularly, the invention relates to an electronic document conversion device and an electronic document conversion method for correctly inheriting a security policy such as "password", "print permission/inhibition", or "character extraction permission/inhibition".

2. Description of the Related Art

In recent years, use of an electronic document that can be read or edited on a computer has spread, where a PDF, an HTML, a JPEG and an XPS are well known as representative electronic document formats. To peruse or edit an electronic document of these formats, a viewer program or an editor program is required, but the viewer or editor for each of the electronic document formats is not necessarily installed in every computer. Also, there is a document management system for managing an existing electronic document corresponding to a paper document by conversion into its own electronic document format (refer to Japanese Patent Laid-Open No. 2001-216230). For the above reason, the conversion between different electronic document formats is indispensable.

Also, a security policy (rule of security) can be set in a relatively new electronic document format represented by the PDF, with a function of imposing a limitation on the functions of edit/perusal/print/character extraction according to the security policy. This is an important function for preventing falsification of electronic documents or leakage of information.

The security policy should be inherited even upon conversion into another electronic document policy, to fulfill its purpose (prevention of falsification or prevention of information leakage). However, there are electronic document formats without any security policy. In such electronic document formats, there is a problem that if, for example, a PDF file with print inhibition set is converted into the HTML or JPEG format in an electronic document conversion system, the file becomes printable.

Also, among electronic documents supporting a security policy, the specifications for the security policy are different for each electronic document format. For example, consider a case where an electronic document in a format in which the character extraction inhibition can be set for each character string or each area is converted into another electronic document format (e.g., PDF) in which the character extraction inhibition can be set only for characters. In this case, there is a problem in that the setting of the character extraction inhibition for each character string or each area is canceled.

SUMMARY OF THE INVENTION

An object of the present invention is to provide an electronic document conversion device and an electronic document conversion method of converting an electronic document into another electronic document format, wherein a security policy set in the original electronic document is substantially reflected to the electronic document after conversion. Also, if it is not possible to reflect the set security policy in the converted electronic document, the conversion itself is inhibited.

The present invention provides an electronic document conversion device for making the format conversion from an electronic document of a first electronic document format, which supports at least one security policy, having certain specifications, into an electronic document of a second electronic document format different from the first electronic document format, comprising inheritance judgment means for judging whether or not a security policy set in the electronic document of the first electronic document format is inheritable, with the same settings, by a security policy and specifications supported by the second electronic document format, replacement judgment means for judging whether or not the set security policy is inheritable using a replacing process, if the inheritance judgment means judges that the set security policy is not inheritable with the same settings, conversion means for converting the electronic document into the second electronic document format by setting the set security policy to be inherited with the same security policy settings, if the inheritance judgment means judges that the security policy is inheritable, and setting the set security policy to be inherited using the replacing process, if the replacement judgment means judges that the security policy is inheritable, and stop means for stopping the conversion of the electronic document into the second electronic document format if the replacement judgment means judges that the security policy is not inheritable.

According to the invention, the security policy set in the electronic document before conversion is inherited by the electronic document after conversion. If the security policy is not inheritable by the specifications of the electronic document format after conversion, another stricter security policy is applied or the format of the contents within the electronic document is converted to substantially observe the security policy. Consequently, the security policy set in the electronic document before conversion can be observed. If the security policy can not be observed by any means, the electronic document is not converted, whereby the security policy of the original document can be observed.

Further features of the present invention will become apparent from the following description of exemplary embodiments (with reference to the attached drawings).

DESCRIPTION OF THE EMBODIMENTS

The preferred embodiments of the present invention will be described below in detail with reference to the drawings. However, it will be appreciated that the components as described in the embodiments are for exemplary purposes only, and not intended to limit the scope of this invention to them. In the following drawings, the parts having the same function are designated by the same reference numerals, and the duplicate explanation is omitted.

In one embodiment of the invention, a format conversion process for the electronic document is controlled in the following way to solve the above-mentioned problems.

An electronic document conversion device according to one embodiment of the invention makes the format conversion from an electronic document of a first electronic document format supporting at least one security policy as the specifications into a second electronic document format different from the first electronic document format. The security policy (security rule) set in the electronic document (original document) before conversion may be set for all or part of the security policy items settable in the first electronic document format.

At this time, if the second electronic document format supports the security policy set in the original document as the specifications, the electronic document conversion device of the invention inherits the security policy set in the original document, and sets it to the electronic document after conversion. That is, in making the format conversion, a process for inheriting the security policy set in the original document to the electronic document after conversion is performed.

On the other hand, if the second electronic document format does not support the security policy set in the original document as the specifications, the electronic document conversion device of the invention can stop the format conversion of the electronic document. Also, if the security policy involves the permission and inhibition of character string within the original document, the electronic document conversion device of the invention can substantially observe the security policy by converting the character into the image.

Namely, if the security policy set in the electronic document (original document) before conversion is supported as the specifications of the electronic document format after conversion, the set security policy is reflected to the electronic document after conversion. If the security policy already set in the electronic document before conversion is not supported as the specifications of the electronic document format after conversion, the application of another severer security policy or the data conversion of the contents within the electronic document is attempted to substantially observe the security policy. Also, if the security policy can not be observed even by changing the format of the contents within the document, the conversion process itself for the electronic document is stopped.

<Configuration of Document Conversion System>

Figure 1:
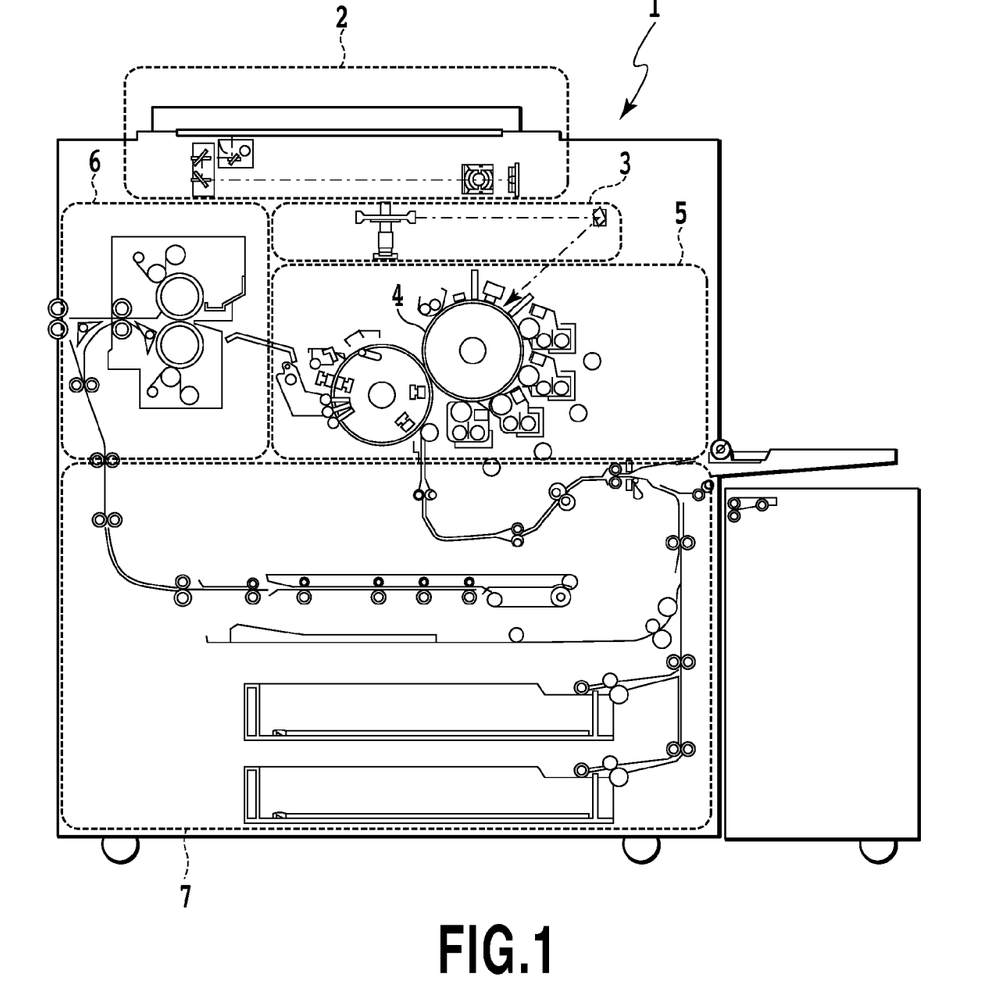
FIG. 1 is a side cross-sectional view showing a structure of an image processing apparatus (MFP) according to one embodiment of the present invention.

Referring to FIG. 1, the configuration of a color MFP suitable for applying one embodiment of the invention will be described below.

The color MFP 1 comprises a scanner part 2, a laser exposure part 3, a photosensitive drum 4, an image creation part 5, a fixing part 6, a sheet supply/feeding part 7, and a printer control unit, not shown, for controlling them.

The scanner part 2 optically reads an original image by applying illumination to an original laid on a platen glass, and converts the image into an electrical signal to create the image data.

The laser exposure part 3 makes a beam of light such as laser light modulated in accordance with the image data incident on a rotation polygon mirror (polygon mirror) rotating at an equal angular velocity and applies a reflected scan light to the photosensitive drum 4.

The image creation part 5 drives the rotation of the photosensitive drum 4 to be charged with a charger unit, develops a latent image formed on the photosensitive drum 4 by the laser exposure part 3 with the toner, and transfers a toner image onto the sheet. A series of electro-photographic processes including withdrawing the minute toner remaining on the photosensitive drum 4 without being transferred are performed to create the image. In this case, while the sheet is wound around a predetermined position of a transfer belt, and rotated four times, the developing units (developing stations) having the toners of magenta (M), cyan (C), yellow (Y) and black (K) repeatedly perform the electro-photographic processes in succession. After four rotations, the sheet onto which the full color toner image of four colors is transferred is conveyed from a transfer drum to the fixing part 6.

The fixing part 6 is composed of a combination of rollers and belts, and contains a heat source such as a halogen heater, whereby the toner on the sheet onto which the toner image is transferred by the image creation part 5 is fused and fixed by heat and pressure.

The sheet supply/feeding part 7 has one or more sheet depots represented by a sheet cassette or a paper deck, separates one sheet from a multiplicity of sheets stored in the sheet depot in accordance with an instruction of the printer control unit, and conveys it to the image creation part 5 and the fixing part 6. The sheet is wound around the transfer drum of the image creation part 5, and after being rotated four times, conveyed to the fixing part 6. While the sheet is rotated four times, the toner image of each color of YMCK is transferred onto the sheet. Also, in the case where the image is formed on both sides of the sheet, the sheet having passed through the fixing part 6 is controlled to move on the conveying path to the image creation part 5 again.

The printer control unit communicates with an MFP control unit for controlling the overall MFP 1 to perform the control in accordance with its instruction, and instruct the overall system to operate smoothly in harmony while managing the status of each of the scanner part, the laser exposure part, the image creation part, the fixing part and the sheet supply/feeding part.

<System Configuration>

Figure 2:
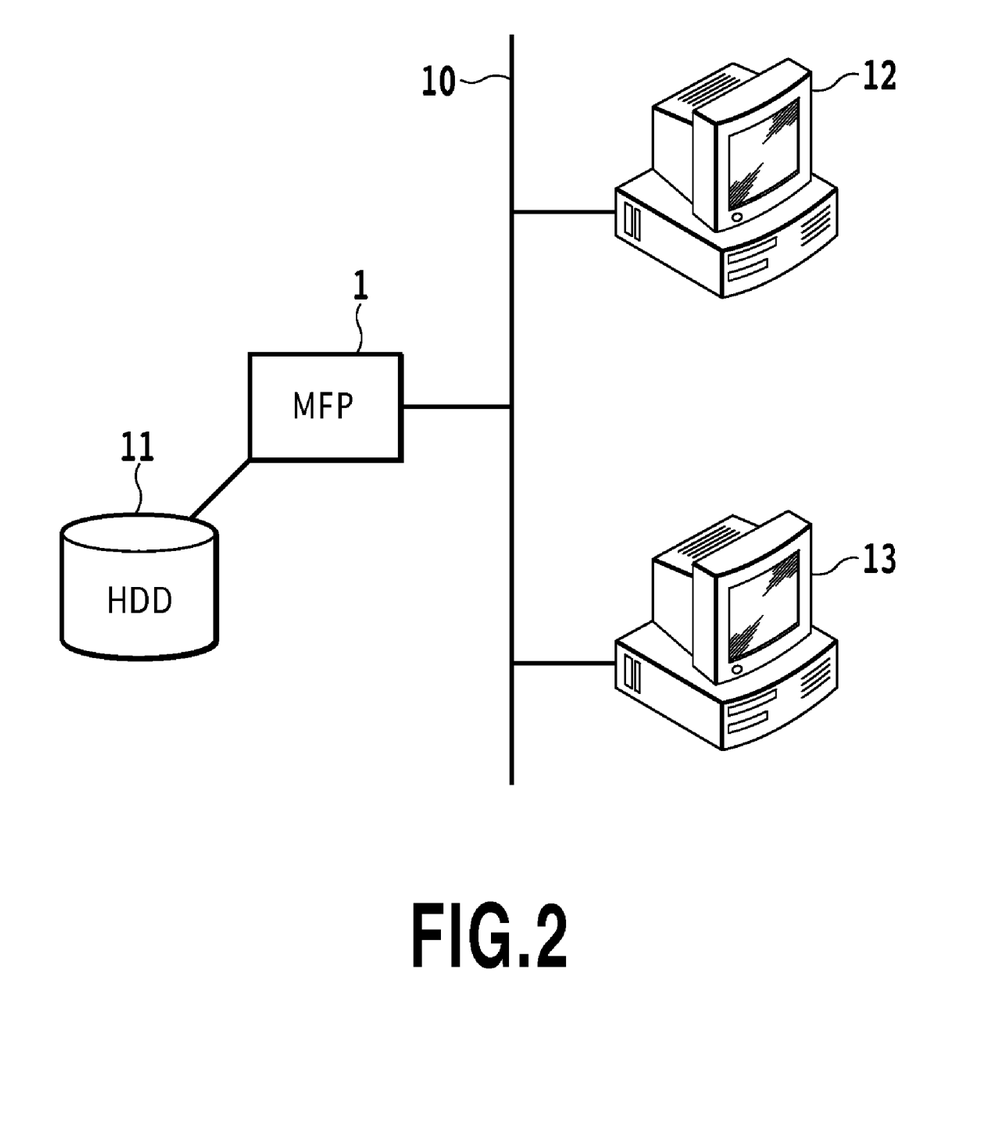
FIG. 2 is a diagram showing one example of a system configuration according to one embodiment of the invention.

FIG. 2 is a block diagram showing the MFP and associated apparatuses mounting the electronic document conversion device according to one embodiment of the invention. In FIG. 2, the MFP 1 mounting the electronic document conversion device is connected via an LAN (Local Area Network) 10 to the computers 12 and 13.

The MFP 1 comprises an HDD (Hard Disk Drive: secondary storage unit) 11. It should be noted that the number of MFPs and computers connected to the LAN 10 is arbitrary. Also, the connection between the MFP 1 and the computers 12 and 13 is not limited to the LAN, but may be connected via the Internet or telephone line, for example.

<Configuration of Controller Unit>

Figure 3:
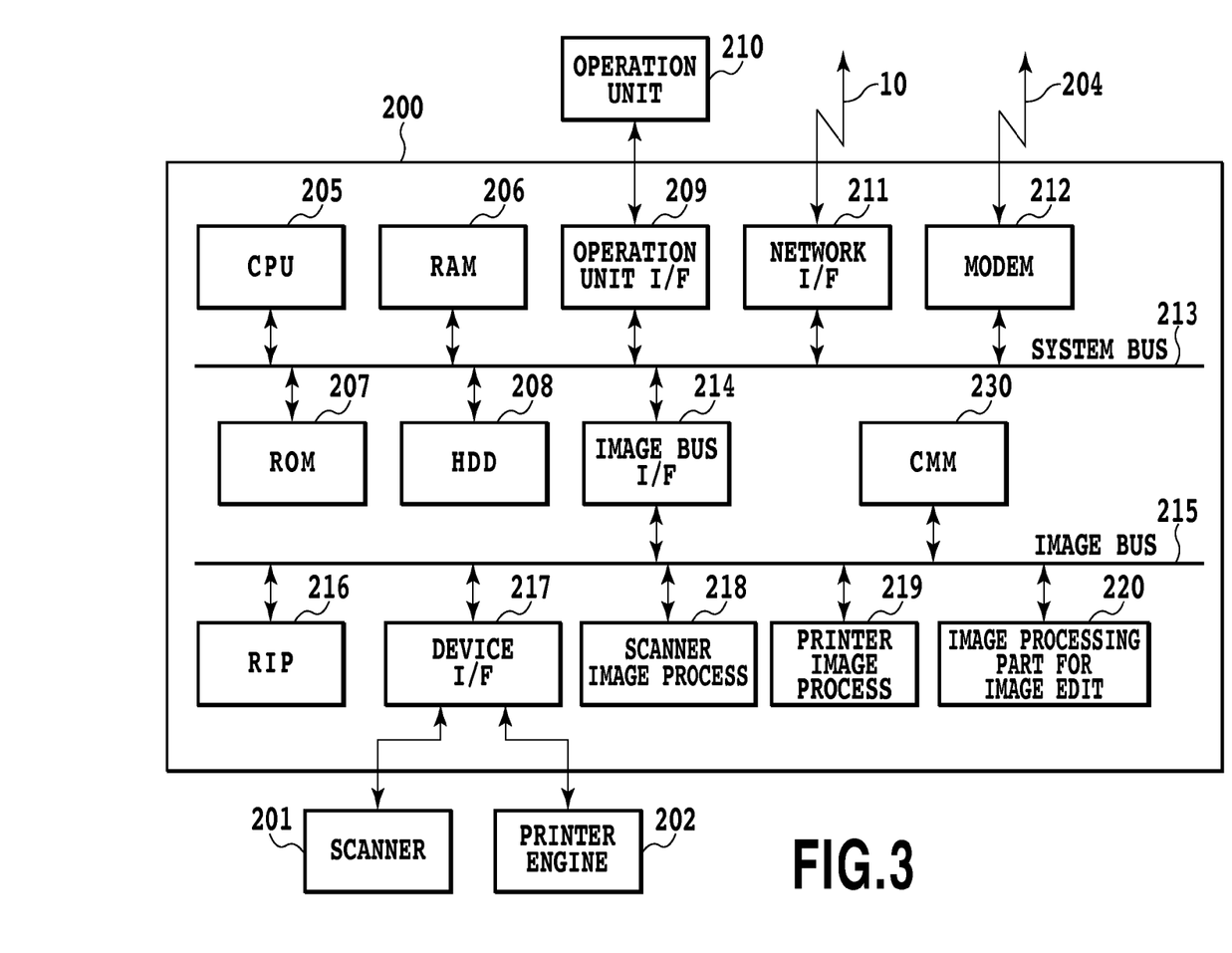
FIG. 3 is a block diagram showing a configuration example of a control unit for each part according to one embodiment of the invention.

FIG. 3 is a block diagram showing one configuration example of a control unit (controller) for the MFP according to one embodiment of the invention. In FIG. 3, the control unit 200 is connected to a scanner 201 that is an image input device and a printer engine 202 that is an image output device, and makes the control for the reading and printout of image data. Also, the control unit 200 is connected to the LAN 10 or public line 204, and makes the control for inputting and outputting the image information or device information via the LAN 10.

Figure 4:
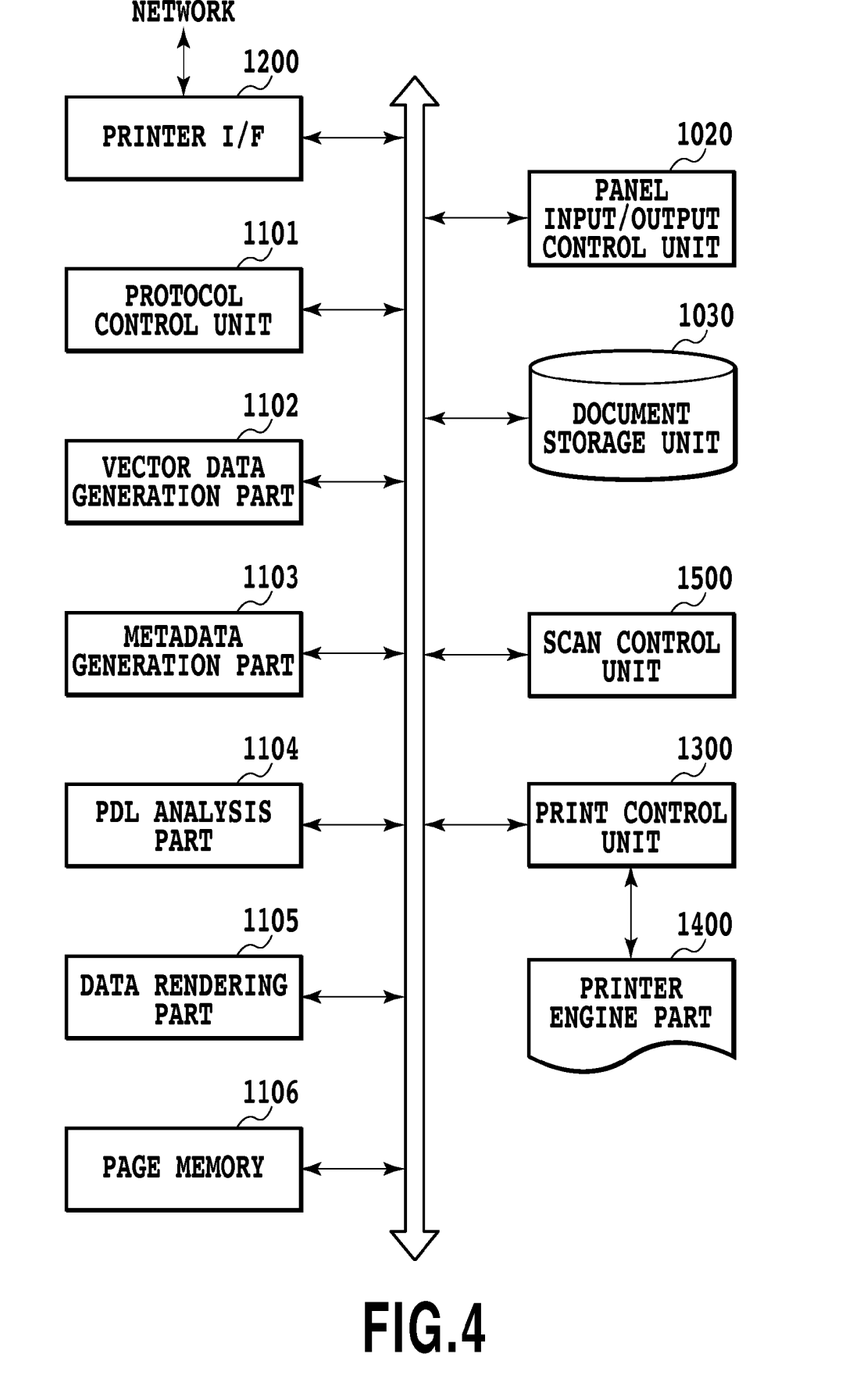
FIG. 4 is a block diagram showing one configuration example of controller software according to one embodiment of the invention.

A CPU 205 is a central processing unit for controlling the overall MFP. The CPU 205 generally controls the access to various kinds of device being connected, based on a control program of FIG. 7 or 8, stored in a ROM 207 or an HDD 208. Concurrently, various kinds of process performed inside the controller or each part as shown in FIG. 4 is generally controlled.

A RAM 206 is a system work memory for the CPU 205 to operate, and also an image memory for temporarily storing the input image data. Further, the ROM 207 is a boot ROM storing a boot program of the system. The HDD 208 is a hard disk drive that stores the system software for various kinds of process and the input image data.

An operation unit I/F 209 is an interface with an operation unit 210 having a display screen that can display the image data and so on, and outputs the operation screen data to the operation unit 210. Also, the operation unit I/F 209 has a role of conveying the information inputted from the operation unit 210 by the operator to the CPU 205. The operation unit 210 has an input operation unit including a keyboard or various kinds of switches for inputting a predetermined command or data, and a display part for displaying various states including the input and set statuses of the apparatus. A network interface 211 is realized by a LAN card, for example, and connected to the LAN 10 to makes the input or output of information into or from an external apparatus. Furthermore, a modem 212 is connected to the public line 204 to makes the input or output of information into or from the external apparatus. The above units are arranged over a system bus 213.

An image bus I/F 214 is an interface for connecting the system bus 213 and an image bus 215 for transferring image data at high speed, and a bus bridge for converting the data structure. A raster image processor (RIP) 216, a device I/F 217, a scanner image processing part 218, a printer image processing part 219, an image editing image processing part 220, and a color management module 230 are connected over the image bus 215.

The RIP 216 is the raster image processor, which expands a page description language (PDL) code or vector data as will be described later to the image. A device I/F part 217 connects the scanner 201 or printer engine 202 to the control unit 200 to make the conversion of image data between the synchronous system and the asynchronous system.

Also, a scanner image processing part 218 performs various kinds of processing such as correction, manipulation and edit for the image data inputted from the scanner 201. A printer image processing part 219 performs the processing such as correction and resolution conversion for the image data to be printed out according to the printer engine. An image editing image processing part 220 performs various kinds of processing such as rotation of image data, compression or decompression of image data and so on. A CMM 230 is a dedicated hardware module for performing a color conversion process (also called a color space conversion process) for the image data, based on a profile or calibration data. The profile is information on a function of converting the color image data represented in a color space dependent on the apparatus into another color space (e.g., Lab) not dependent on the apparatus. The calibration data is data for modifying the color reproduction characteristics of the scanner part 201 or the printer engine 202 in the MFP 1 that is a color multi-function printer.

<Controller Software Configuration>

FIG. 4 is a block diagram showing the configuration of the controller software for controlling the operation of the MFP 1 comprising the electronic document conversion device according to one embodiment of the invention. The parts of the controller software as shown in FIG. 4 are generally controlled by the CPU 205, as described above.

A printer interface 1200 is means for making the input or output into or from the outside. A protocol control unit 1101 is means for communicating with the outside by analyzing a network protocol for transmission. A vector data generation part 1102 generates (vectorizes) the vector data that is a rendering description not dependent on the resolution from the raster data.

A metadata generation part 1103 generates the secondary information obtained in a vectorization process as the metadata. The metadata is additional control data unnecessary for the rendering process.

A PDL analysis part 1104 is means for analyzing the PDL data or electronic document data such as PDF or JPEG to generate the vector data and further converting it into an intermediate code (Display List: DL) in a form suitable for the printing process. The intermediate code generated in the PDL analysis part 1104 is passed to a data rendering part 1105 and processed. The data rendering part 1105 expands the intermediate code to the raster data, in which the expanded raster data is serially rendered in a page memory 1106.

The page memory 1106 is a volatile memory for temporarily holding the raster data expanded by a renderer.

When the PDL analysis part 1104 analyzes the PDL data or electronic document data, the metadata is generated by the metadata generation part 1103. The metadata is additional information of the PDL data processed by the PDL analysis part 1104, including the security policy information that the document has. In one embodiment of the invention, the information stored as the security policy includes "edit password", "perusal password" and "print permission/inhibition". For example, if the input data is a PDF file, each information of "edit password", "perusal password" and "print permission/inhibition" set in the PDF file is inherited as the security policy to the metadata.

A panel input/output control unit 1020 controls the input/output from the operation panel.

A document storage unit 1030 is means for generating and storing a data file containing the vector data, DL and metadata for each group (job) of the input document, and realized by a secondary storage device such as a hard disk. In one embodiment of the invention, this data file is called an ODF (Optimized Document Format), in which one document is held in an ODF format.

A scan control unit 1500 performs various kinds of processing such as correction, manipulation and edit for the image data inputted from the scanner.

A print control unit 1300 converts the contents of the page memory 1106 into a video signal and transfers the image to a printer engine part 1400. The printer engine part 1400 is a print mechanism part for forming a permanent visible image of the received video signal on the recording paper.

<ODF Data Structure>

Figure 5:
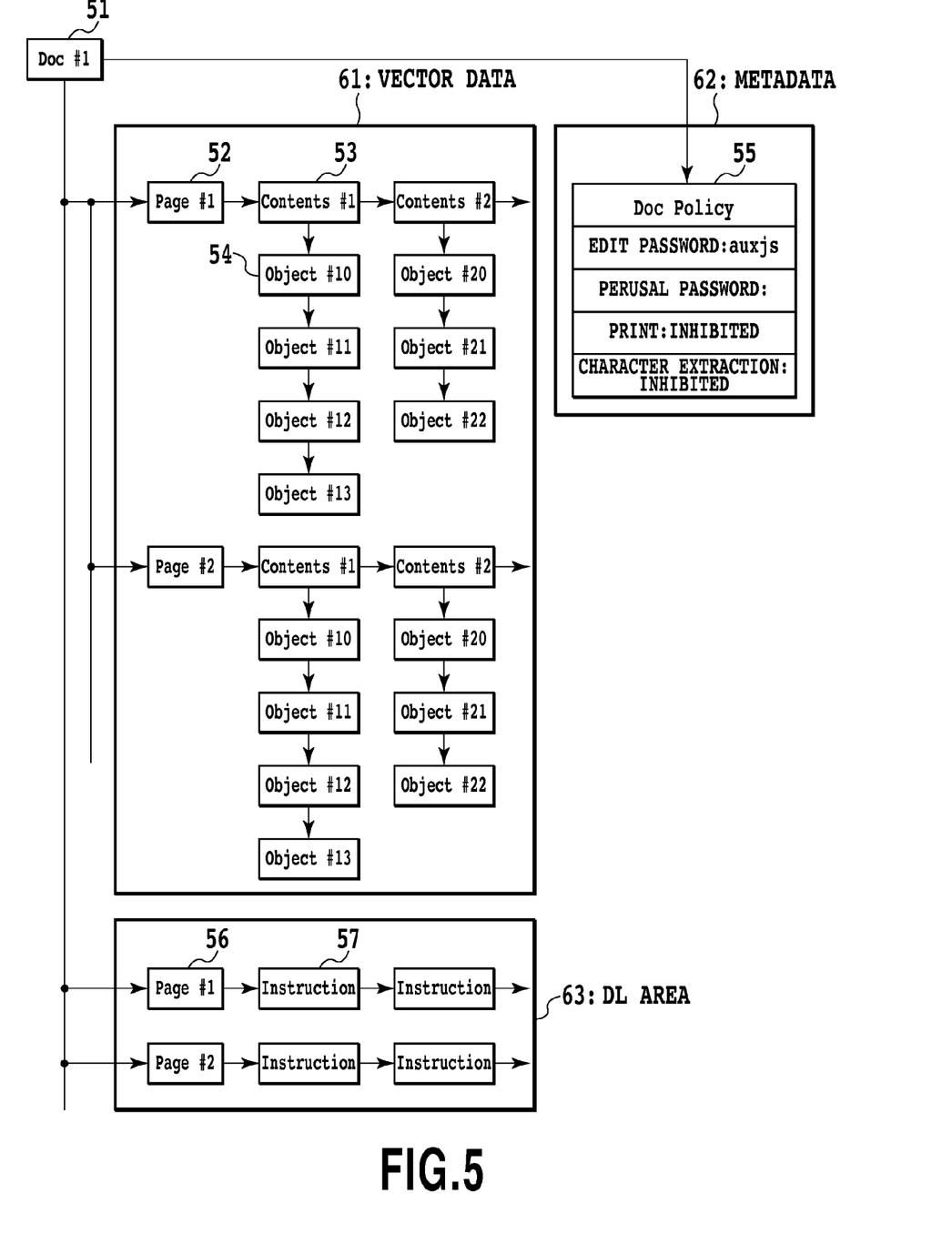
FIG. 5 is a diagram showing a data structure of document according to one embodiment of the invention.

FIG. 5 shows the data structure of an ODF.

The ODF is the data composed of a plurality of pages, largely divided into the vector data 61, the metadata 62 and a DL area 63, and has a hierarchical structure starting from a document header 51. The vector data 61 further includes a page header 52, the contents information 53, and an object 54. In the metadata 62, the security policy information 55 of this document is stored. The DL area 63 further includes a page header 56 and a rendering expansion instruction 57. In the document header 51, a vector data storage location, a DL area storage location and a metadata storage location are described. That is, the vector data, the DL and the metadata are associated by the document header 51.

Since the vector data 61 is the rendering data not dependent on the resolution, the layout information such as page size or direction is described in the page header 52. Each object 54 is linked to one rendering data such as character, line, polygon and a Bezier curve, and a plurality of objects are collectively associated with the contents information 53. The contents information 53 collectively represents the feature of the plurality of objects.

The metadata 62 is additional control information not pertinent to the rendering process. In one embodiment of the invention, the "edit password", "perusal password", "print permission/inhibition" and "character extraction permission/inhibition" can be set as the security policy of the document. That is, the security policy information 55 includes a situation of setting the security policy.

In this specification as described above, the settable security policy is "edit password", "perusal password", "print permission/inhibition" or "character extraction permission/inhibition", but not limited to them. In one embodiment of the invention, in making the format conversion of the electronic document, the security policy is inherited or substantially inherited (inherited with a replacement security policy), and if not possible, the inheritance is essentially stopped, in which the function itself of the security policy is not essential. Hence, the other functions than the four security policies as described above may be set. Also, the number of security policies is not limited to four, but at least one or more security policies may be settable.

The DL area 63 involves an intermediate code for the renderer to perform the rendering process. In the page header 56, a management table for rendering information (instruction) within the page is described, and the instruction 57 includes the rendering information dependent on the resolution.

The security policy of the document is inherited with the policy set in the PDL data thrown into the PDL analysis part 1104 or a PDF file as the initial value. In an example of FIG. 5, "auxjs" is set as the "edit password". The "perusal password" is unset. Also, the execution of printing is inhibited, in which the "edit password" is asked in executing the printing, and the print restriction is temporarily lifted by inputting the "edit password".

The document in an ODF format can be directly perused or edited on a computer 12 (or 13) mounting a viewer or editor of the ODF, and perused or edited by copying it to the computer 12 (or 13). The "edit password" is required in editing, or the "perusal password" is required in perusal. In FIG. 5, the inhibition of character extraction is set in this document, whereby it is impossible to extract the character or character string from the viewer or editor of the computer 12 (or 13) and incorporate it into another file. To enable the character extraction, it is necessary to input the "edit password", and change the security policy of the document.

Figure 6:
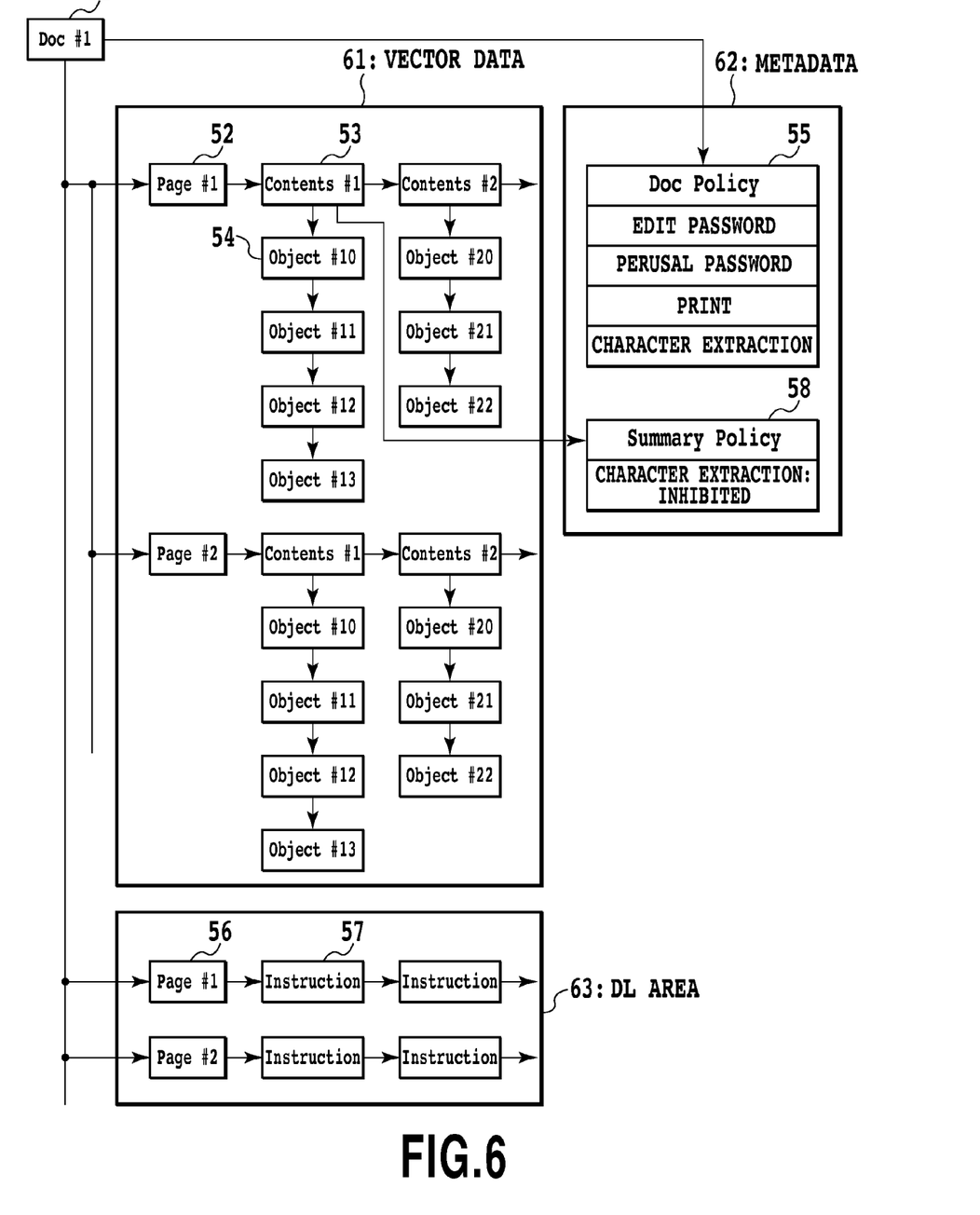
FIG. 6 is a diagram showing a data structure of document according to one embodiment of the invention.

Also, the ODF can hold the metadata information for each content within the vector data 61, in which the character or character string extraction permission or inhibition can be set by the editor of the computer 12 (or 13). FIG. 6 shows an example of metadata in the case where some character strings (corresponding to the contents information (53)) are set to the extraction inhibition by the editor of the computer 12 (or 13). That is, the extraction is inhibited for part of a plurality of pieces of contents information (some characters or character strings).

In FIG. 6, the security policy information 58 corresponding to the contents information 53 that is part of contents information is generated, indicating that the contents information 53 is character extraction inhibition. The security policy for other contents information is not set, and the character extraction is permitted. That is, the character extraction is permitted, but inhibited for part of the document (some characters or character strings: contents 53) as the security policy in FIG. 6.

<Document Conversion Process>

The MFP 1 according to one embodiment of the invention generates and prints the document in the ODF format from the received PDL data or electronic document, and additionally has a document conversion function of converting the generated document in the ODF format into another electronic document format. Such document conversion function is implemented by the CPU 205 executing a program as shown in FIG. 7 or 8, whereby the following document conversion process is performed.

The document conversion process according to one embodiment of the invention has a feature of inheriting the security policy of the document before conversion to the document after conversion. A procedure thereof will be described below with reference to FIGS. 7 and 8.

First Embodiment

Figure 7:
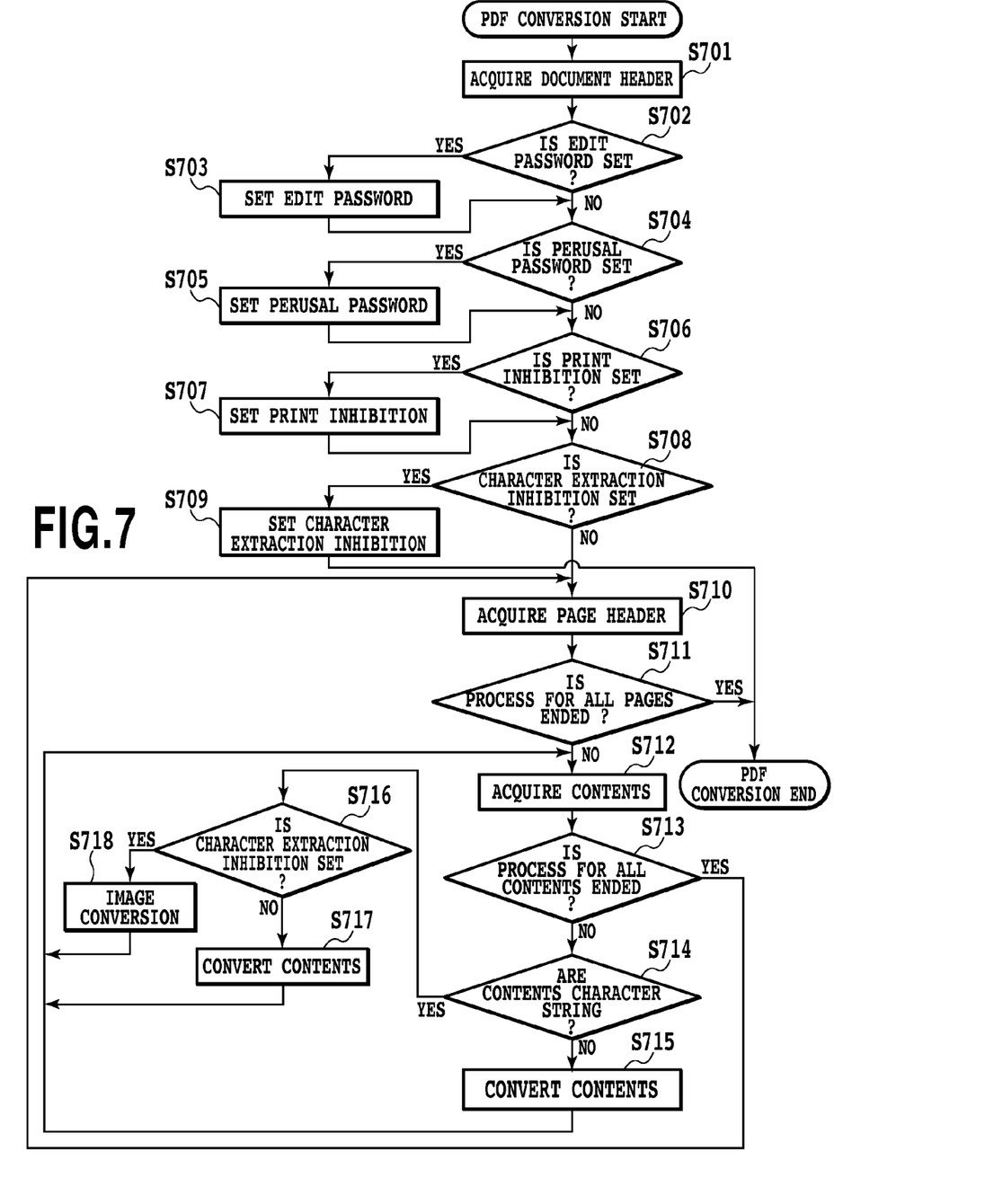
FIG. 7 is a flowchart for explaining a procedure of document format conversion according to one embodiment of the invention.
Figure 8:
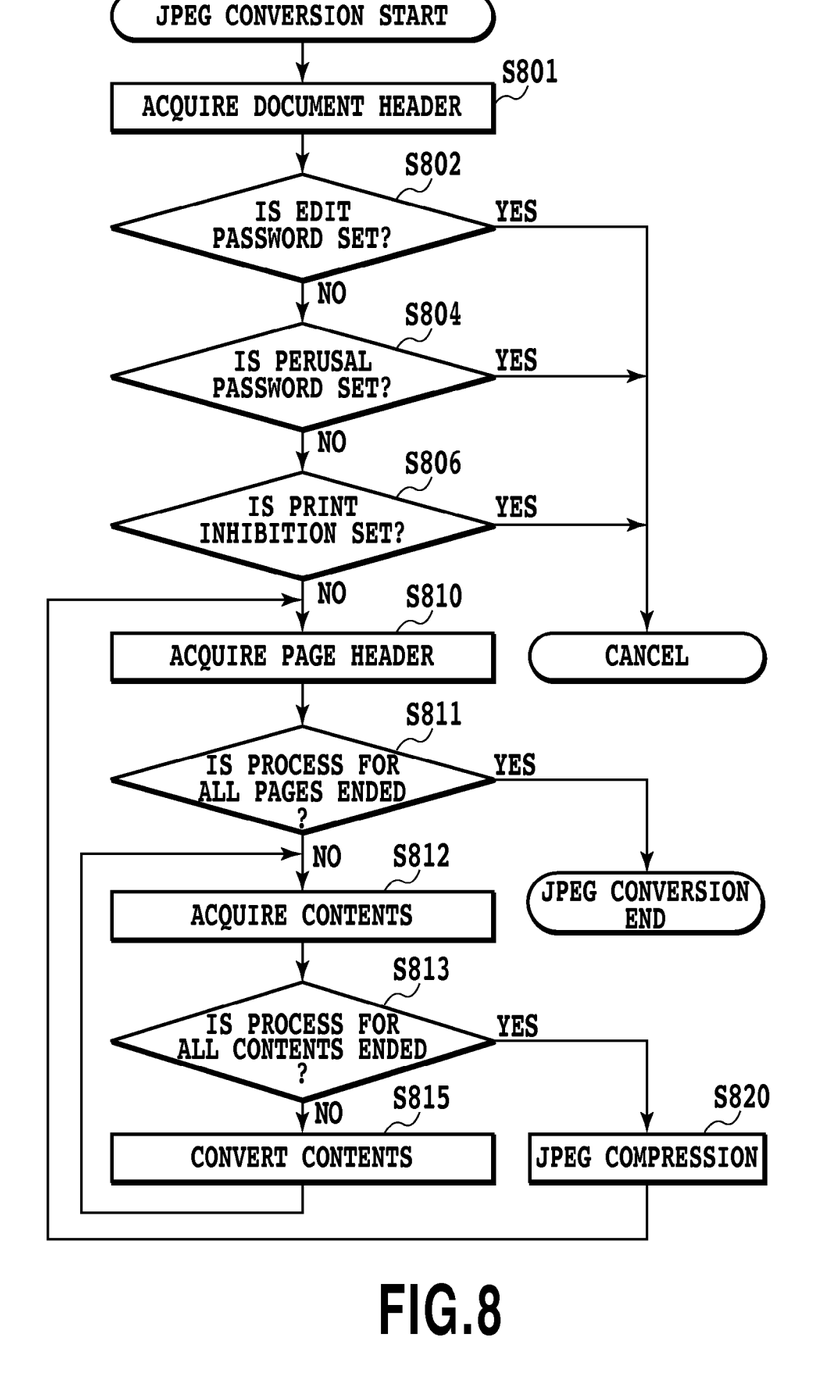
FIG. 8 is a flowchart for explaining the procedure of document format conversion according to one embodiment of the invention.

FIG. 7 is a flowchart for converting the document in the ODF format into the PDF.

In a process of FIG. 7, the format of the electronic document (original document) before conversion that is a conversion source is the ODF format, supporting the "edit password", "perusal password", "print permission/inhibition", and "character extraction permission/inhibition (for the entire document)". Also, the "character extraction permission/inhibition for part of the document (some characters or character strings)" can be similarly set.

On the other hand, the format of the electronic document after conversion is the PDF format. The security policies supported by the PDF and dealt with in this embodiment are four security policies of "edit password", "perusal password", "print permission/inhibition" and "character extraction permission/inhibition", which are security policies targeted for the entire document. Accordingly, the "character extraction permission/inhibition for part of the document" that is supported in the ODF format is not supported.

If the conversion into the PDF is instructed for the document in the ODF format, first of all, the CPU 205 acquires the header of document at step S701. And the CPU 205 acquires the security policy information for this document stored in the metadata.

At each of steps S702, S704, S706 and S708, the CPU 205 judges whether or not the "edit password", "perusal password", "print permission/inhibition" and "character extraction permission/inhibition" are set in the original document. That is, the CPU 205 analyzes the security policy information acquired at step S701, and judges whether or not each security policy information is set in the original document at steps S702, S704, S706 and S708.

If the security policy is set in the original document, the CPU 205 sets the security policy to the PDF file after conversion at steps S703, S705, S707 and S709. That is, if it is judged that the "edit password" is set at step S702, the CPU 205 sets the "edit password" of the security policy supported by the PDF to the electronic document after conversion at step S703. Also, if it is judged that the "perusal password" is set at step S704, the CPU 205 sets the "perusal password" of the security policy supported by the PDF to the electronic document after conversion at step S705. Also, if it is judged that the "print permission/inhibition" is set at step S706, the CPU 205 sets the "print permission/inhibition" of the security policy supported by the PDF to the electronic document after conversion at step S707. Further, if it is judged that the "character extraction permission/inhibition (for the entire document)" is set at step S708, the procedure goes to step S709. That is, the CPU 205 sets the "character extraction permission/inhibition" for the entire document that is the security policy supported by the PDF to the electronic document after conversion at step S709. The "character extraction permission/inhibition" set at step S709 is targeted for the entire document, as described above. If step S709 is ended, the CPU 205 ends the process by converting the format of document into the PDF.

In this way, the electronic document conversion device according to this embodiment judges whether or not the security policy set in the original document can be inherited to the electronic document after format conversion, based on the security policy supported in the format of conversion destination. If the security policy is inheritable, the electronic document conversion device inherits the security policy set in the original document to the electronic document after format conversion in making the format conversion of the electronic document.

That is, the electronic document conversion device can inherit the security policy in making the format conversion, if the format of conversion destination supports the security policy set in the electronic document (original document) subject to conversion. Accordingly, in the case where the print inhibition is set as the security policy before conversion, for example, the "print inhibition" can be set to the electronic document after conversion, if the format of conversion destination supports the security policy corresponding to the print inhibition. Hence, it is possible to avoid a situation where the security policy set before format conversion is not set after conversion. Also, it is possible to lighten a user's load of setting the security policy to the electronic document after conversion again.

Next, the CPU 205 proceeds to step S710 to acquire the page header information, and further proceeds to step S711 to judge whether or not all the pages are processed. At step S711, the CPU 205 judges that if there is no page header to be acquired, all the pages are processed. If all the pages are already processed, the conversion process into the PDF is ended. If the format conversion of the electronic document is not yet performed at the end of the conversion process, the CPU 205 ends the process by converting the format of document into the PDF.

In the following, the steps S712 to S718 will be described below. If it is judged that the "character extraction inhibition for the entire document" is set at step S708, the "character extraction inhibition" for the entire PDF document is set at step S709 and the process is ended. On the other hand, if it is judged that the "character extraction inhibition for the entire document" is not set, the procedure goes to step S710. If the character extraction inhibition for the entire document is not set, there is the possibility that the security policy for the "character extraction permission/inhibition for part of the document" not supported in the PDF format is set in the original document. Thus, the CPU 205 judges whether or not the "character extraction inhibition" is set for each content and judges whether or not the "character extraction inhibition for part of the document" is set at steps S712 to S718. And if it is judged that the "character extraction inhibition for part of the document" is set, the security policy of "character extraction inhibition for part of the document" is consequently inherited by converting the set character string into the image format. That is, if the character code is not stored in the PDF by conversion into the image, the extraction (copy) can not be made by the character code, whereby the security policy can be inherited.

By the way, if it is judged that there is any page to be processed at step S710, the CPU 205 proceeds to step S712 to acquire the contents information, and further proceeds to step S713 to judge whether or not all the contents are processed. At step S713, the CPU 205 judges that if there is no contents information to be acquired, all the contents process is ended. If all the contents are already processed, the CPU 205 returns to step S710 to acquire the page header at the next page.

If it is judged that the contents to be processed remain at step S713, the CPU 205 proceeds to step S714 to judge whether or not the contents are the character string. That is, the CPU 205 judges whether or not the contents corresponding to the contents information are the character string, based on the contents information acquired at step S712. If the contents are not the character string, the CPU 205 proceeds to step S715 to perform a conversion process for the contents corresponding to each object, and writes into the PDF file at the output destination. In this case, the graphic object is outputted as the graphic, and the image object is outputted as the image.

If it is judged that the contents are the character string at step S714, the CPU 205 proceeds to step S716 to read the security policy of the contents, and judge whether or not the "character extraction inhibition for part of the document" is set. That is, the CPU 205 judges whether or not the "character extraction inhibition for part of the document" is set by referring to the security policy information. If the "character extraction inhibition for part of the document" is not set, the CPU 205 proceeds to step S717 to write the character object as the character into the PDF file at the output destination.

If the "character extraction inhibition for part of the document" is set, the CPU 205 proceeds to step S718 to convert part of the character object for which the character extraction inhibition is set into the image format, and writes into the PDF file at the output destination.

For example, if the original document being converted at present has the data structure as shown in FIG. 6, and the contents information 53 is acquired at step S712, the security policy information 58 corresponding to the contents information 53 is the "character extraction inhibition". In this way, since the "character extraction inhibition" is set for part of the contents, it follows that the "character extraction inhibition for part of the document" is set. Hence, at step S716, the CPU 205 judges that the "character extraction inhibition for part of the document" is set, based on the security policy information 58 indicating the "character extraction inhibition".

In this embodiment, since the character extraction is inhibited for the character string of the contents corresponding to the contents information 53, the CPU 205 makes the image conversion for the objects #10 to #13 included in the contents information 53 at step S718. The contents information 53 is the information indicating a part of the character string area, and the objects #10 to #13 correspond to the characters (character codes) included in the character string area.

Accordingly, the "character extraction inhibition for part of the document" function is not supported in the PDF format that is the format of conversion destination, but because the objects #10 to #13 are converted into the images through the above image conversion, the character extraction for part of the document can be consequently inhibited. That is, the security policy set in the original document but not supported in the format of conversion destination can be substantially inherited to the electronic document after conversion.

In this way, the electronic document conversion device of this embodiment performs the following process without performing the process for inheriting the security policy to the electronic document after conversion, if the "character extraction inhibition for part of the document" is substantially set in the security policy set in the original document. That is, only the character string for which the character extraction inhibition is set is converted into the image format to substantially inhibit the character extraction of the character string after conversion, as described above.

Thereby, the security policy of "character extraction inhibition" is observed for that portion even in the PDF file after conversion. After finishing output to the PDF file at steps S715, S717 and S718, the CPU 205 returns to step S712 to acquire the contents to be processed at the next time.

At this time, the CPU 205 judges whether or not the contents are the character string at step S714, and if so, judges whether or not the "character extraction inhibition" is set to the character string (contents) at step S716. And if it is judged that the "character extraction inhibition" is set to the contents at step S716, the character string is subjected to image conversion, or if it is judged that the "character extraction inhibition" is not set, the character string is converted as the character. Hence, the character string for which the character code extraction is inhibited and the character string for which the character code extraction is permitted can be mixed in the electronic document after format conversion finally obtained, according to the user's desire.

Though the conversion into the image format is made at step S718, the conversion into another format incapable of the character extraction such as a graphic format may be alternatively made.

Through the above procedure, the security policy set in the document of the ODF format is observed after conversion into the PDF.

In FIG. 7, if the "character extraction inhibition" is set in part of the contents (character string), the character object of interest is converted into the image in the above procedure. However, in the embodiment, another method for outputting the character object as the character to the PDF and finally setting the security policy of "character extraction inhibition" to the entire PDF document may be adopted. In this case, the character for which the character extraction is not essentially inhibited is also subjected to extraction inhibition, but when the "character extraction inhibition" is later canceled by the "edit password", the document for which the character extraction is permitted can be regenerated. That is, the conversion may be possible if the security is severer.

Also, if the format of conversion destination supports the character extraction inhibition for the entire document, but does not support the character extraction inhibition for part of the document, and the character extraction inhibition for part of the document is set in the original document, such as the PDF as described above, the following process may be performed. That is, for the electronic document after conversion, all the document may be converted into the image format or graphic format.

In this way, the electronic document conversion device may apply the severer security policy, instead of the security policy set in the original document but not supported in the format of conversion destination in the embodiment.

Second Embodiment

FIG. 8 is a flowchart where the document in the ODF format is converted into a JPEG. The JPEG is a simple image format, and has no concept of the security policy. That is, the security policy for imposing the edit restriction such as "edit password", the security policy for imposing the perusal restriction such as "perusal password", and the security policy for setting the print permission or inhibition such as "print permission/inhibition" are not supported.

If the conversion of the document in the ODF format into the JPEG is instructed, first of all, the CPU 205 acquires the header of document and acquires the security policy information of this document stored in the metadata at step S801.

At each of steps S802, S804 and S806, the CPU 205 judges whether or not the "edit password", "perusal password" and "print permission/inhibition" are set in the original document. If any policy is set, the CPU 205 does not make the conversion into the JPEG, and stops the process. That is, since the JPEG that is the format of conversion destination does not support an edit restriction function, the CPU 205 judges that the format conversion of the document is stopped, if the "edit password" is set in the original document at step S802. Similarly, since the JPEG does not support a perusal restriction function, the CPU 205 judges that the format conversion of the document is stopped, if the "perusal password" is set in the original document at step S804. Further, since the JPEG does not support a print inhibition function, the CPU 205 judges that the format conversion of the document is stopped, if the "print inhibition" is set in the original document at step S806.

In this way, the electronic document conversion device can stop the format conversion of the document, if the format of conversion destination does not support at least one of the security policies set in the original document.

Next, the CPU 205 proceeds to step S810 to acquire the page header information, and further proceeds to step S811 to judge whether or not all the pages are processed. If all the pages are already processed, the conversion process into the JPEG is ended.

If there is any page to be processed, the CPU 205 proceeds to step S812 to acquire the contents information, and further proceeds to step S813 to judge whether or not all the contents are processed. If all the contents are already processed, the CPU 205 proceeds to step S820 to compress the image of one page in the JPEG format, and returns to step S810 to acquire the page header at the next page. If the contents to be processed remain, the CPU 205 proceeds to step S815 to convert each object of the contents into the image format, and returns to step S812 to acquire the contents to be processed at the next time.

According to the above procedure, if any security policy set in the document in the ODF format and not observed by conversion into the JPEG exists, the conversion itself is not performed. Hence, it is possible to prevent the document against the security policy of the original document from being generated.

In this embodiment, if the format of conversion destination does not support the security policy for setting the permission or inhibition of character extraction such as "character extraction permission/inhibition", the process is performed in the following way. That is, a judgment block as to whether or not the "character extraction inhibition" is set is provided. And if the "character extraction inhibition" is set in the original document, the CPU 205 judges that the format conversion of the document is stopped in the above judgment block, because the format of conversion destination does not support a character extraction inhibition function.

Third Embodiment

Figure 9:
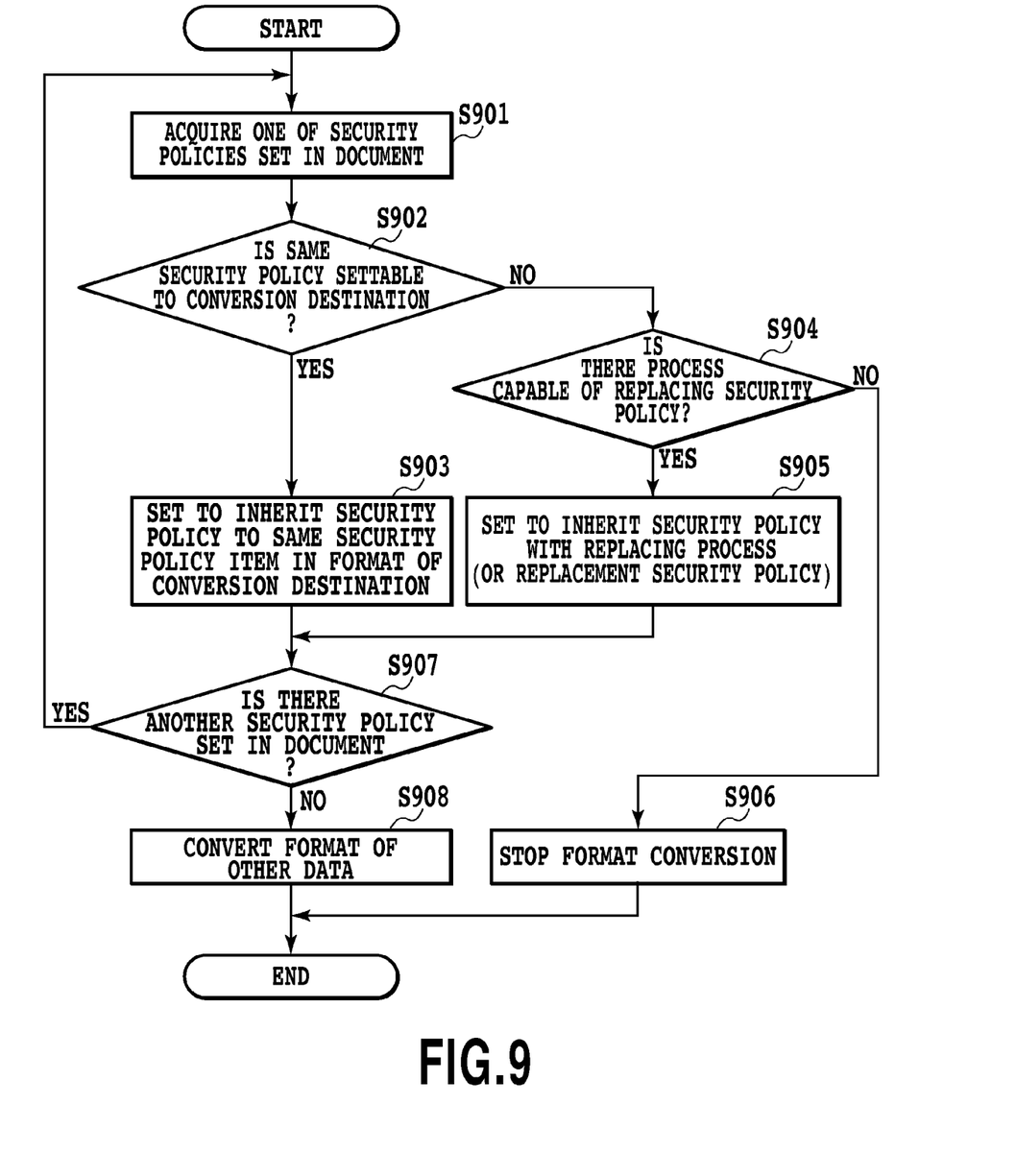
FIG. 9 is a flowchart for explaining the procedure of document format conversion according to one embodiment of the invention.

A process for inheriting the security policy as described in the first and second embodiments by conversion into other formats than the PDF and JPEG will be described below. FIG. 9 shows a flowchart of a process for converting the document of the first format into the document of the second format.

At step S901, one of the security policies (security rules) already set in the document before conversion is acquired.

For the acquired security policy, at step S902, it is judged whether or not the same security policy can be set in the format of conversion destination (inheritance judgment process). If it is judged that the same security policy can be set, the procedure goes to step S903, or if it is judged that the same security policy can not be set (non-inheritable), the procedure goes to step S904.

At step S903, the setting is made that the security policy is inherited to the same security policy item in the format of conversion destination.

At step S904, it is judged whether or not the security policy can be replaced with another process (or another security policy) (replacement judgment process). If it is judged that the security policy can be replaced, the procedure goes to step S905, or if it is judged that the security policy can not be replaced, the procedure goes to step S906. That is, it is judged whether or not there is another means for substantially observing the security policy already set in the document. For example, if the security rule of character extraction inhibition for a certain partial area is set at the time of conversion into the PDF, it is judged that the security policy can be replaced with a process for converting the character code in the partial area into the image, as described in the first embodiment. In this way, if it is judged that the security can be observed with the replacing process, the procedure goes to step S905.

At step S905, the setting is made that the security policy is inherited with the replacing process (or the replacement security policy (severer security policy)).

At step S906, judging that the security policy can not be inherited, the format conversion is stopped, and after notifying the user that the conversion is stopped because the security can not be maintained, the process is ended.

At step S907, it is judged whether or not there is another security policy already set in the document of conversion source, and if it is judged that there is another security policy, the procedure returns to step S901 to acquire another security policy. On the other hand, if it is judged that there is not another security policy, the procedure goes to step S908.

At step S908, the format conversion process is performed, including the information other than the security, whereby a data file after conversion is produced.

Fourth Embodiment

Though the MFP 1 comprises the electronic document conversion device for performing the process for inheriting the security policy according to the invention in the first to third embodiments, other apparatus than the MFP 1 may comprise the electronic document conversion device.

In this embodiment, a form in which the computer 12 comprises the electronic document conversion device will be described below. In this case, the CPU of the computer 12 reads a program as shown in FIGS. 7 and 8 stored in a memory of the computer 12, and executes it to perform the process as described in the first to third embodiments.

Fifth Embodiment

The optimization of an ODF document will be described below.

The electronic document conversion device for the MFP 1 according to the invention has not only a function of converting the document format, but also a function of optimizing the ODF document according to its purpose at the time of generating the ODF document or changing the security policy.

First of all, the electronic document conversion device receives the electronic document of the PDL or PDF, and generates only the vector data and metadata but does not generate the DL, if the security policy of "print inhibition" is set in the received document. The DL that is generated from the vector data but used for printing is judged to be unnecessary. Also, if the security policy of "print inhibition" is set for the generated ODF document, the electronic document conversion device deletes the generated DL. Generally, the DL is aimed to perform the printing fast, and has typically a large capacity. Accordingly, it is effective that the unused DL is not generated, or is deleted, because the HDD 208 is not cluttered.

Conversely, the electronic document conversion device is controlled to generate the DL at the time when the security policy of "print inhibition" is canceled for the generated ODF document. Thereby, the printing performance is improved.

In this way, the electronic document conversion device of this embodiment can optimize the electronic document by changing the data structure of the electronic document in accordance with the security policy set in the electronic document acquired by receiving it or the changed security policy.

As described above, in the invention, in the case of making the format conversion from the electronic document of the ODF format into the electronic document of the PDF or JPEG, the security policy of the document before conversion can be inherited. Also, if the security policy can not be inherited by any means, the conversion can be stopped to observe the document before conversion. Also, the document can be optimized in accordance with the settings of the document policy to reduce the capacity or increase the higher speed at the time of printing.

In the above embodiment, the conversion from the ODF document as defined in the embodiment into the PDF or JPEG has been exemplified above. However, the electronic document before conversion and the electronic document after conversion are not limited to the ODF, PDF and JPEG, but the invention is effective between arbitrary electronic document formats.

Other Embodiments

The present invention can be applied to a system composed of a plurality of devices (e.g., computer, interface unit, reader, and printer) or an apparatus (e.g., multi-function printer, printer, and facsimile) composed of a single device.

A processing method for storing a program for operating the configuration of the embodiments to implement the functions of the embodiments in a storage medium, reading the program stored in the storage medium as a code and executing the code on a computer may be included within the category of the above embodiments. That is, a computer readable storage medium is also included within the scope of the embodiment. Also, not only the storage medium storing the computer program but also the computer program itself may be included in the above embodiments.

Examples of such storage medium may be a floppy (registered trademark) disk, a hard disk, an optical disk, a magneto-optical disk, a CD-ROM, a magnetic tape, a non-volatile memory card, or a ROM, for example.

Also, not only the program stored in the storage medium for singly performing the process but also the program for performing the operation of the embodiments by operating on an OS in cooperation with the functions of the other software or an expansion board are also included in the category of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-122562, filed May 8, 2008, which is hereby incorporated by reference herein in its entirety.

What is claimed is:

1. An electronic document conversion device for making a format conversion from an electronic document of a first electronic document format, which supports at least one security policy having certain specifications, into an electronic document of a second electronic document format different from the first electronic document format, comprising:
   inheritance judgment means for judging whether or not a security policy set in the electronic document of the first electronic document format is inheritable, with the same settings, by a security policy and specifications supported by the second electronic document format;
   replacement judgment means for judging whether or not the set security policy is inheritable using a replacing process, if said inheritance judgment means judges that the set security policy is not inheritable with the same settings;
   conversion means for converting the electronic document into the second electronic document format by setting the set security policy to be inherited with the same security policy settings, if said inheritance judgment means judges that the security policy is inheritable, and setting the set security policy to be inherited using the replacing process if said replacement judgment means judges that the security policy is inheritable using a replacing process; and
   stop means for stopping the conversion of the electronic document into the second electronic document format if said replacement judgment means judges that the security policy is not inheritable;
   wherein at least one of said inheritance judgment means, said replacement judgment means, said conversion means and said stop means is implemented using a processor.

2. The electronic document conversion device according to claim 1, wherein said replacing process is a process for replacing using data conversion of the contents within the electronic document subject to the set security policy.

3. The electronic document conversion device according to claim 1, wherein said replacing process is a process for replacing the security policy of the first electronic document format with a stricter security policy of the second electronic document format.

4. The electronic document conversion device according to claim 2, wherein if security policies set in the electronic document of the first electronic document format include a security policy of character extraction inhibition for part of the document, and the second electronic document format does not support the security policy of character extraction inhibition for part of the document within its specifications, said replacing process is a process for converting the character or character string for which the character extraction inhibition for part of the document is set into an image or graphic.

5. The electronic document conversion device according to claim 1, wherein for the electronic document of the first electronic document format for which a plurality of security policies are set, if said inheritance judgment means judges that any of the plurality of security policies is not inheritable, and said replacement judgment means judges that inheritance using a replacing process is not possible, said stop means stops the conversion of the electronic document into the second electronic document format.

6. The electronic document conversion device according to claim 1, wherein the data structure of the electronic document is further changed to delete unnecessary data or not to generate unnecessary data, in accordance with the set security policy.

7. An electronic document conversion method for making a format conversion from an electronic document of a first electronic document format, which supports at least one security policy having certain specifications, into an electronic document of a second electronic document format different from the first electronic document format, the method using at least one processor to perform:
   an inheritance judgment step of judging whether or not a security policy set in the electronic document of the first electronic document format is inheritable, with the same settings, by a security policy and specifications supported by the second electronic document format;
   a replacement judgment step of judging whether or not the set security policy is inheritable using a replacing process, if it is judged that the security policy is not inheritable in said inheritance judgment step;
   a conversion step of converting the electronic document into the second electronic document format by setting the set security policy to be inherited with the same security policy settings, if it is judged that the security policy is inheritable in said inheritance judgment step, and setting the set security policy to be inherited using the replacing process, if it is judged that the security policy is inheritable in said replacement judgment step; and
   a stop step of stopping the conversion of the electronic document into the second electronic document format if it is judged that the security policy is not inheritable in said replacement judgment step.

8. The electronic document conversion method according to claim 7, wherein the replacing process is a process for replacing using data conversion of the contents within the electronic document subject to the set security policy.

9. The electronic document conversion method according to claim 7, wherein the replacing process is a process for replacing the security policy of the first electronic document format with a stricter security policy of the second electronic document format.

10. The electronic document conversion method according to claim 8, wherein if the security policy set in the electronic document of the first electronic document format includes a security policy of character extraction inhibition for part of the document, and the second electronic document format does not support the security policy of character extraction inhibition for part of the document within its specifications, the replacing process is the process for converting the character or character string for which the character extraction inhibition for part of the document is set into an image or graphic.

11. The electronic document conversion method according to claim 7, wherein for the electronic document of the first electronic document format for which a plurality of security policies are set, if it is judged that any of the plurality of security policies is not inheritable at said inheritance judgment step, and it is judged that inheritance using a replacing process is not possible in said replacement judgment step, said stop step comprises stopping the conversion of the electronic document into the second electronic document format.

12. The electronic document conversion method according to claim 7, further comprising changing the data structure of the electronic document to delete unnecessary data or not to generate unnecessary data, in accordance with the set security policy.

13. A non-transitory computer-readable storage medium storing a computer readable program for causing a computer to perform a method, the method comprising:

an inheritance judgment step of judging whether or not a security policy having certain specifications set in an electronic document of a first electronic document format is inheritable, with the same settings, by a security policy and specifications supported by a second electronic document format;

a replacement judgment step of judging whether or not the set security policy is inheritable using a replacing process, if it is judged that the security policy is not inheritable at said inheritance judgment step;

a conversion step of converting the electronic document into the second electronic document format by setting the set security policy to be inherited with the same security policy settings, if it is judged that the security policy is inheritable in said inheritance judgment step, and setting the set security policy to be inherited using the replacing process, if it is judged that the security policy is inheritable in said replacement judgment step; and a stop step of stopping the conversion of the electronic document into the second electronic document format if it is judged that the security policy is not inheritable in said replacement judgment step.

* * * * *